Oct. 14, 1958     D. L. JAYET     2,855,826
EXTERNAL FILTER SUPPORT FOR UNDERWATER CAMERA CASINGS
Filed July 19, 1955

INVENTOR
David L. Jayet.

BY

ATTORNEY

United States Patent Office 2,855,826
Patented Oct. 14, 1958

2,855,826

EXTERNAL FILTER SUPPORT FOR UNDERWATER CAMERA CASINGS

David L. Jayet, Le Trayas, France

Application July 19, 1955, Serial No. 522,990

Claims priority, application Switzerland August 10, 1954

1 Claim. (Cl. 88—113)

The invention has for its subject an optical instrument with at least a filter adapted to be immersed in a liquid.

Instruments of this character are already known, especially fluidtight casings for apparatus or photographic cameras and divers' lenses or masks for submarine exploration. It is usual, in photography to use filters of various colours for modifying the rendering of tints. These filters, however, involve a predetermined loss of luminosity and a reduction in the contrasts by reason of reflections which are produced on their faces.

The invention has for its object to remedy these inconveniences and for its subject an optical instrument with at least a filter, characterised in that it has a device for securing the filter, arranged in such a manner that the two faces of the filter are in contact with the liquid in which the instrument is emerged, in order to reduce the effects of parasite light and the losses of luminosity due to reflexions on the faces of the filter.

Two forms of construction of the subject of the invention are shown diagrammatically and by way of example in the accompanying drawings, wherein.

Figure 1:
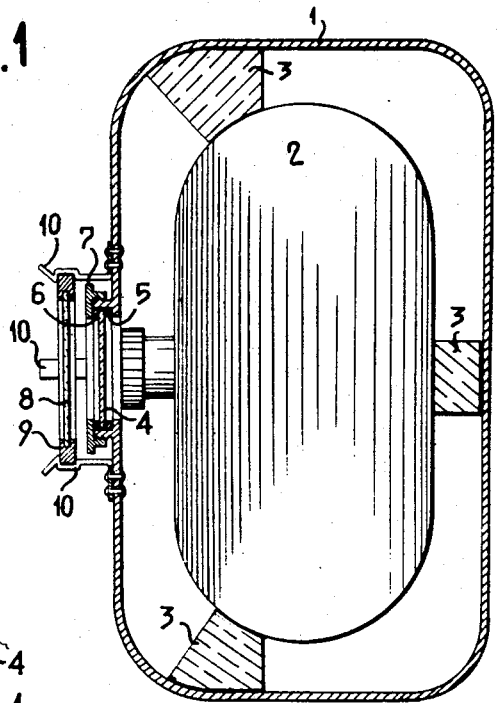
Fig. 1 is a section of a fluidtight casing for a cinematographic camera.

The instrument shown in Fig. 1 comprises a casing 1 in which is mounted a cinematographic camera 2 of which the position relatively to the casing, is ensured by means of rubber blocks 3. Said casing has an aperture for light obturated by a glass plate 4, clamped between fluidtight joints 5 and 6 by means of a screw ring 7, all in the known manner. A filter 8 is placed in front of the glass plate 4, in such a manner that its two faces are in contact with the liquid when the instrument is immersed. Said filter 8 is provided with a ring 9 on its periphery, which is secured in a removable manner to the casing 1 by resilient supports 10 secured to the walls of the casing. The end of these supports 10 is in the form of a hook having depressed seats for the ring, which enables the filter to be removed at will, for example for replacing it by a filter of different colour.

As shown in the drawings, the resilient supports 10 are preferably in the form of strips having laterally offset feet at one end for being attached to the casing 1, the other end of the strip being provided with an inclined terminal portion leading to a depressed seat which presents opposite shoulders for holding therebetween the ring 9 of the filter 8.

When the screen is formed by glass having an index of refraction equal to 1.5 and when said screen is plunged into water, it is possible to show by calculation that the parasite reflections are two hundred times smaller than when the screen is located in air. Further, almost all the incidental light passes through the said screen, whilst when it is located in air, about 7.5% of the light received does not pass through the screen, as it is reflected to the side of the source. The fact of placing the filter in such a manner that its two faces are in contact with the liquid thus enables the efficiency and the apparent transparency of the filter to be increased, whilst contrasts are better preserved by reason of the quasi-total absence of parasite reflexions.

By reason of the fact that the losses due to reflexions on the faces are insignificant, it is possible to provide a number of successive filters immersed in the liquid without being subjected to appreciable loss of light.

Figure 2:
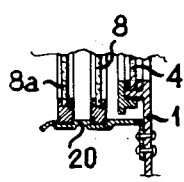
Fig. 2 is a sectional view of a modification.

Fig. 2 is a partial view of a fluidtight box similar to that in Fig. 1, but having hooks 20 enabling two filters 8 and 8a to be secured one behind the other in such a manner that the two faces of each filter are in contact with the liquid.

The forms of construction described above relate to a submarine camera, but it will be understood that it is possible to secure filters in the manner described to any optical instrument capable of being immersed in a liquid, particularly on television cameras and all apparatus for submarine viewing in general.

I claim:

In an underwater photographic camera having a fluidtight casing and a sealed transparent window in front of the camera lens, resilient filter frame supporting strips each having a body portion provided at one end with laterally offset attaching feet secured to the outer side of the casing at opposite sides of said window, the other end of the body of each supporting strip having a terminal inclined guide portion at the threshold of an adjacent depressed seat providing spaced shoulders in the body for receiving a filter frame insertable and removable in the direction of the length of said strips, said frame when clamped between related shoulders being disposed in spaced relation to said window so that both faces of the filter are in contact with the water to reduce the effect of parasitic light and the loss of luminosity due to reflections on the face of the filter, said guide portions and seats facilitating the exchange of one filter with another during submersion.

References Cited in the file of this patent

UNITED STATES PATENTS

| | | |
|---|---|---|
| 1,481,007 | Herold et al. | Jan. 15, 1924 |
| 1,518,141 | Gage | Dec. 9, 1924 |
| 1,710,245 | Schryver | Apr. 23, 1929 |
| 2,088,262 | Grano | July 27, 1937 |
| 2,256,133 | Barnes | Sept. 16, 1941 |
| 2,358,231 | Johnson | Sept. 12, 1944 |
| 2,396,267 | Johnson | Mar. 12, 1946 |
| 2,481,808 | Barna | Sept. 13, 1949 |

OTHER REFERENCES

Cross: "Underwater Photography and Television," published in New York, N. Y., 1954, pages 75, 76 and 117 cited.